US010840787B2

(12) United States Patent
Takahashi

(10) Patent No.: US 10,840,787 B2
(45) Date of Patent: Nov. 17, 2020

(54) ROTATING ELECTRIC MACHINE

(71) Applicant: DENSO CORPORATION, Kariya (JP)

(72) Inventor: Yuuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/333,936

(22) PCT Filed: Sep. 11, 2017

(86) PCT No.: PCT/JP2017/032623
§ 371 (c)(1),
(2) Date: Mar. 15, 2019

(87) PCT Pub. No.: WO2018/051937
PCT Pub. Date: Mar. 22, 2018

(65) Prior Publication Data
US 2019/0214894 A1    Jul. 11, 2019

(30) Foreign Application Priority Data

Sep. 15, 2016 (JP) ................................. 2016-180972

(51) Int. Cl.
| | |
|---|---|
| *H02K 21/12* | (2006.01) |
| *H02K 1/24* | (2006.01) |
| *H02K 19/10* | (2006.01) |
| *H02K 19/22* | (2006.01) |
| *H02K 1/14* | (2006.01) |
| *H02K 1/22* | (2006.01) |
| *H02K 1/27* | (2006.01) |

(52) U.S. Cl.
CPC ............ *H02K 21/12* (2013.01); *H02K 1/146* (2013.01); *H02K 1/223* (2013.01); *H02K 1/24* (2013.01); *H02K 1/27* (2013.01); *H02K 19/10* (2013.01); *H02K 19/22* (2013.01)

(58) Field of Classification Search
CPC ............ H02K 1/24; H02K 3/44; H02K 19/10; H02K 3/42; H02K 21/12
USPC ...................................................... 310/156.66
See application file for complete search history.

(56) References Cited

U.S. PATENT DOCUMENTS

2009/0152979 A1*   6/2009   Isogai ................ H02K 21/044
                                                               310/263

FOREIGN PATENT DOCUMENTS

| JP | H04-165950 A | 6/1992 |
| JP | H09-098556 A | 4/1997 |

OTHER PUBLICATIONS

Nov. 21, 2017 International Search Report issued in International Patent Application No. PCT/JP2017/032623.

* cited by examiner

*Primary Examiner* — Terrance L Kenerly
(74) *Attorney, Agent, or Firm* — Oliff PLC

(57) ABSTRACT

A rotating electric machine includes a stator and a rotor. The stator includes a stator core and an armature coil wound on the stator core. The rotor is arranged radially inside the stator to radially face the stator. The rotor includes: a field core having a plurality of magnetic pole portions for respectively forming a plurality of magnetic poles the polarities of which are alternately different in a circumferential direction; a field coil wound on the field core; and a tubular short-circuiting member that is arranged radially outside the magnetic pole portions to cover radially outer surfaces of the magnetic pole portions and magnetically connects each circumferentially-adjacent pair of the magnetic pole portions. Moreover, two axial end portions of the short-circuiting member protrude axially outward respectively from two axial ends of the stator core.

18 Claims, 9 Drawing Sheets

ROTATING ELECTRIC MACHINE

TECHNICAL FIELD

The present invention relates to rotating electric machines.

BACKGROUND ART

Conventionally, there have been known rotating electric machines which are used in vehicles as electric motors and electric generators and which include a stator and a rotor (see, for example, Patent Document 1). In these rotating electric machines, the stator includes a stator core and an armature coil (or stator coil) wound on the stator core. The rotor includes a field core, a field coil and a tubular member.

The field core consists of a pair of pole cores. Each of the pole cores has a boss portion, a disc portion extending radially outward from an axial end of the boss portion, and a plurality of magnetic pole portions that are connected with the disc portion, are located radially outside the boss portion and protrude in an axial direction. The magnetic pole portions are arranged at predetermined intervals in a circumferential direction of the rotor. Moreover, the pair of pole cores are assembled to each other so that the magnetic pole portions of one of the pole cores are arranged alternately with the magnetic pole portions of the other of the pole cores in the circumferential direction. Consequently, the magnetic pole portions of the pair of pole cores respectively form a plurality of magnetic poles the polarities of which are alternately different in the circumferential direction. The field coil is wound on the radially outer side of the boss portions of the pair of pole cores. The tubular member is arranged radially outside the magnetic pole portions of the pair of pole cores to cover radially outer surfaces of the magnetic pole portions. With the tubular member, it is possible to magnetically connect each circumferentially-adjacent pair of the magnetic pole portions and suppress distal end portions of the magnetic pole portions from being deformed radially outward by the centrifugal force during high-speed rotation of the rotor. Consequently, it is possible to reduce leakage of magnetic flux between the magnetic pole portions and thereby achieve output improvement; it is also possible to reduce eddy current loss in the magnetic pole portions.

PRIOR ART LITERATURE

Patent Literature

[Patent Document 1] Japanese Patent Application Publication No. JP2009148057A

SUMMARY OF THE INVENTION

Problems to be Solved by the Invention

In the rotating electric machine where the tubular member is provided to cover the radially outer surfaces of the magnetic pole portions as described above, with the passage of a long period of time, moisture may intrude into a gap between the tubular member and the magnetic pole portions or an electrical potential difference may occur between different metals to form a local cell. When such a local cell is formed, rust may occur in the tubular member due to ion exchange, thereby lowering the strength. Moreover, when stress due to vibration and/or rotation acts thereon in addition to the strength decrease due to rust, it becomes easy for the tubular member to be damaged and further scattered. Upon occurrence of damage to and scattering of the tubular member, a part of the tubular member may be caught on the stator, thereby locking the rotor. Therefore, to prevent the rotor from being locked by the above factor, it is required to detect the occurrence of damage to the tubular member in advance or in an early stage. However, in the rotating electric machine disclosed in Patent Document 1, there is employed no structure taking into account the above situation; therefore, it may be impossible to prevent the rotor from being locked due to aging changes.

The present invention has been made in view of the above-described problems, and aims to provide a rotating electric machine capable of reliably preventing a rotor from being locked when a short-circuiting member (or tubular member) is damaged due to aging changes.

Means for Solving the Problems

According to an embodiment, a rotating electric machine includes a stator and a rotor. The stator includes a stator core and an armature coil (or stator coil) wound on the stator core. The rotor is arranged radially inside the stator to radially face the stator. The rotor includes: a field core having a plurality of magnetic pole portions for respectively forming a plurality of magnetic poles the polarities of which are alternately different in a circumferential direction of the rotor; a field coil wound on the field core; and a tubular short-circuiting member that is arranged radially outside the magnetic pole portions to cover radially outer surfaces of the magnetic pole portions and magnetically connects each circumferentially-adjacent pair of the magnetic pole portions. Moreover, two axial end portions of the short-circuiting member protrude axially outward respectively from two axial ends of the stator core.

With the above configuration, since the two axial end portions of the tubular short-circuiting member, which covers the radially outer surfaces of the magnetic pole portions, protrude axially outward respectively from the two axial ends of the stator core, when damage is caused to the protruding axial end portions of the short-circuiting member, it is difficult for the damaged portions of the short-circuiting member to be caught on a radially inner part of the stator core. Hence, when the axial end portions of the short-circuiting member are damaged due to aging changes, it is possible to reliably prevent the rotor from being locked due to the damage.

In the above rotating electric machine, a welding process, a crimping process or a press process may have been performed on the two axial end portions of the short-circuiting member.

In this case, the two axial end portions of the short-circuiting member become more brittle than the other portions of the short-circuiting member; thus the strength of the two axial end portions becomes lower than the strength of the other portions. Consequently, it is possible to have damage to the two axial end portions of the short-circuiting member occur earlier than damage to the other portions of the short-circuiting member. Hence, it is possible to detect damage to the short-circuiting member due to aging changes in advance or in an early stage.

In the above rotating electric machine, the two axial end portions of the short-circuiting member may be formed of a different material from the other portions of the short-circuiting member.

In this case, it is possible to cause a stress difference between the two axial end portions and the other portions of the short-circuiting member, thereby having breakage occur preferentially at the boundaries between the different materials. Consequently, it is possible to have damage to the two axial end portions of the short-circuiting member occur earlier than damage to the other portions of the short-circuiting member. Hence, it is possible to detect damage to the short-circuiting member due to aging changes in advance or in an early stage.

Further, the short-circuiting member may be constituted of a laminate in which a plurality of predetermined members are laminated in three or more layers in an axial direction. Moreover, the material of the predetermined members of the layers constituting the two axial end portions of the short-circuiting member may be different from the material of the predetermined members of the layers constituting the other portions of the short-circuiting member.

In this case, it is possible to cause a stress difference between the two axial end portions and the other portions of the short-circuiting member, thereby having breakage occur preferentially at the boundaries between the different materials. Consequently, it is possible to have damage to the two axial end portions of the short-circuiting member occur earlier than damage to the other portions of the short-circuiting member. Hence, it is possible to detect damage to the short-circuiting member due to aging changes in advance or in an early stage.

In the above rotating electric machine, the two axial end portions of the short-circuiting member may be formed to bulge radially outward from the other portions of the short-circuiting member.

In this case, the centrifugal force acting on the two axial end portions of the short-circuiting member which bulge is smaller than the centrifugal force acting on the other portions of the short-circuiting member which do not bulge; therefore, it is possible to have stress concentration occur in the two axial end portions. Consequently, it is possible to have damage to the two axial end portions of the short-circuiting member occur earlier than damage to the other portions of the short-circuiting member. Hence, it is possible to detect damage to the short-circuiting member due to aging changes in advance or in an early stage.

Further, the short-circuiting member may be constituted of a wire-like or band-like member that spirally extends and is thereby laminated in the axial direction. Moreover, a curvature of the two axial end portions of the short-circuiting member may be different from a curvature of the other portions of the short-circuiting member.

In this case, the centrifugal force acting on the two axial end portions of the short-circuiting member which bulge is smaller than the centrifugal force acting on the other portions of the short-circuiting member which do not bulge; therefore, it is possible to have stress concentration occur in the two axial end portions. Consequently, it is possible to have damage to the two axial end portions of the short-circuiting member occur earlier than damage to the other portions of the short-circuiting member. Hence, it is possible to detect damage to the short-circuiting member due to aging changes in advance or in an early stage.

In the above rotating electric machine, the magnetic pole portions of the field core may include a plurality of first magnetic pole portions that protrude in a claw shape toward one side in the axial direction and a plurality of second magnetic pole portions that protrude in the claw shape toward the other side in the axial direction. The first magnetic pole portions may be arranged alternately with the second magnetic pole portions in the circumferential direction. One of the two axial end portions of the short-circuiting member may be joined to at least one of distal end portions of the first magnetic pole portions; the other of the two axial end portions of the short-circuiting member may be joined to at least one of distal end portions of the second magnetic pole portions.

In this case, the short-circuiting member is joined to the distal end portions, where stress due to the centrifugal force is highest, of the magnetic pole portions. Therefore, it is possible to have damage to the short-circuiting member occur preferentially at the joints formed in the distal end portions. Consequently, it is possible to detect damage to the short-circuiting member due to aging changes in advance or in an early stage.

In the above rotating electric machine, the short-circuiting member may be constituted of a laminate in which a plurality of predetermined members are laminated in the axial direction. Moreover, each of the axial end portions of the short-circuiting member may protrude axially outward from a corresponding one of the axial ends of the stator core by only one layer.

In this case, since the short-circuiting member is constituted of the laminate, it is possible to limit, unlike in the case of the short-circuiting member being constituted of a cylindrical pipe-like member, those portions of the short-circuiting member to which damage may be caused to the axially outermost layers, thereby preventing damage from being caused to those layers which are located axially inside the axially outermost layers. Consequently, it is possible to prevent the damaged portions of the short-circuiting member from being caught on a radially inner part of the stator core while suppressing the amount by which the short-circuiting member protrudes axially outward from the axial ends of the stator core.

In the above rotating electric machine, the short-circuiting member may be fixed to the magnetic pole portions with a plurality of protrusions respectively fitted in a plurality of recesses; the protrusions and the recesses are formed in the magnetic pole portions and the short-circuiting member to protrude or be recessed from opposing surfaces of the magnetic pole portions and the short-circuiting member.

In this case, it is possible to fix the short-circuiting member to the magnetic pole portions using the protrusions and the recesses on the magnetic circuit formed in the rotor; it is also possible to increase the q-axis inductance or lower the d-axis inductance in the magnetic pole portions and thereby generate reluctance torque. As a result, it is possible to achieve torque improvement.

In the above rotating electric machine, the two axial end portions of the short-circuiting member may be arranged to respectively radially face a pair of coil end parts of the armature coil; the pair of coil end parts protrude axially outward respectively from the two axial ends of the stator core.

In this case, since the two axial end portions of the short-circuiting member respectively radially face the pair of coil end parts, when the axial end portions of the short-circuiting member are damaged, it is possible to have the damaged portions make contact with the coil end parts by the centrifugal force during rotation of the rotor. Therefore, it is possible to detect damage to the short-circuiting member based on whether electric current flowing in the coil end parts is normal or abnormal or based on whether a voltage generated in the coil end parts is normal or abnormal.

EMBODIMENT FOR CARRYING OUT THE INVENTION

Hereinafter, an embodiment and modifications will be described with reference to FIGS. 1-15.

Figure 1:
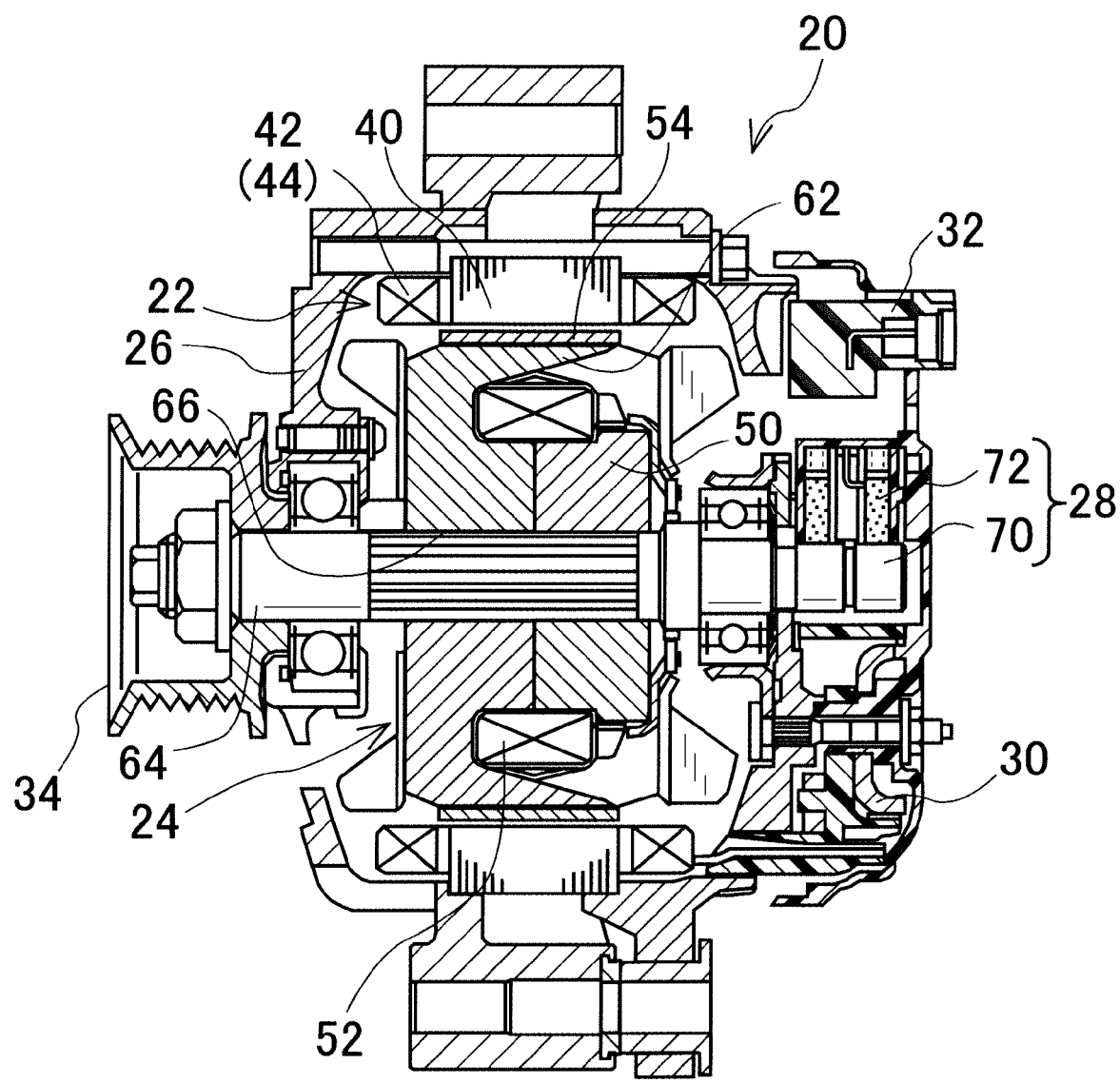
FIG. 1 is a partially cross-sectional view of a rotating electric machine according to an embodiment.
Figure 2:
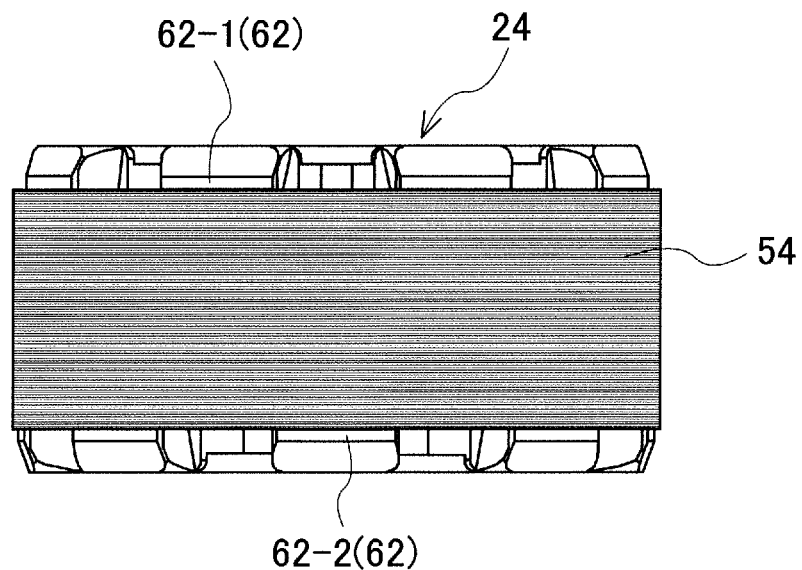
FIG. 2 is a plan view, from the radially outer side, of a rotor of the rotating electric machine.
Figure 3:
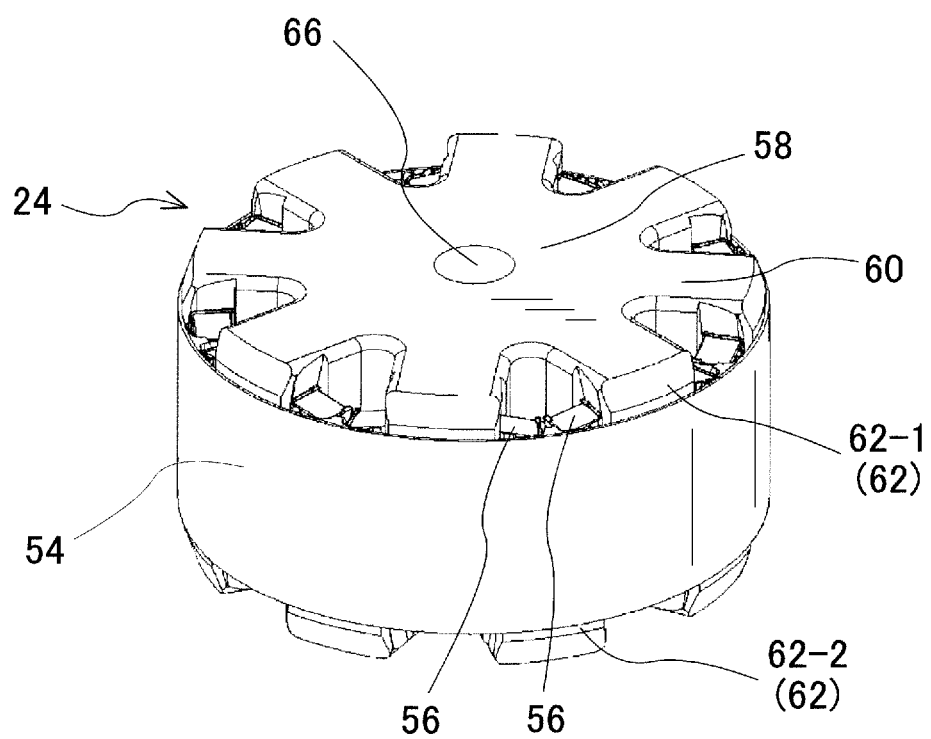
FIG. 3 is a perspective view of the rotor.
Figure 4:
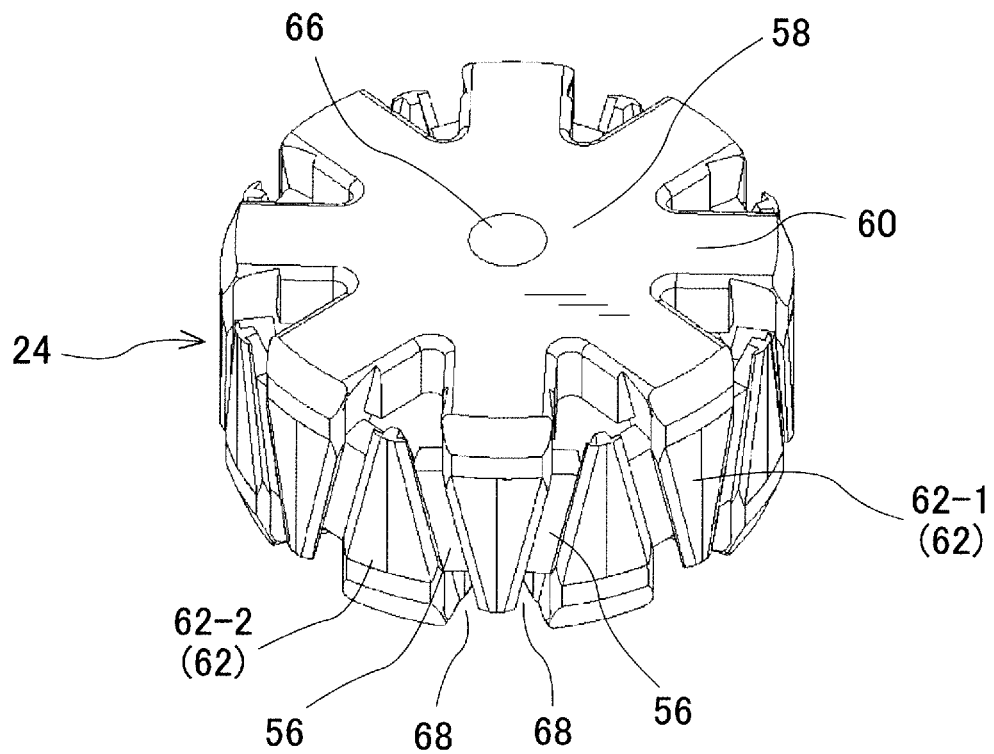
FIG. 4 is a perspective view of the rotor omitting a short-circuiting member.
Figure 5:
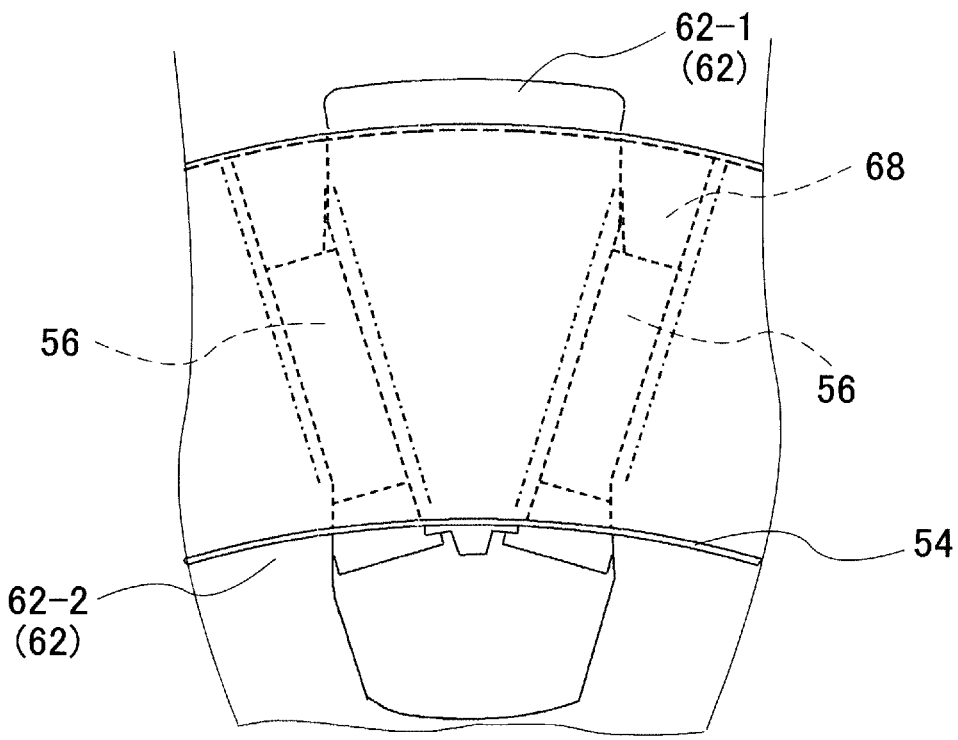
FIG. 5 is a perceptive view of part of the rotor.

FIG. 1 shows the overall configuration of a rotating electric machine 20 according the embodiment. In the present embodiment, the rotating electric machine 20 is mounted in, for example, a vehicle. The rotating electric machine 20 generates drive power for driving the vehicle upon being supplied with electric power from an electric power source such as a battery. Moreover, the rotating electric machine 20 generates electric power for charging the battery upon being supplied with mechanical power from an engine of the vehicle. As shown in FIG. 1, the rotating electric machine 20 includes a stator 22, a rotor 24, a housing 26, a brush device 28, a rectifier 30, a voltage regulator 32 and a pulley 34.

The stator 22 constitutes part of a magnetic circuit formed in the rotating electric machine 20. Moreover, the stator 22 generates electromotive force upon application of a rotating magnetic field thereto with rotation of the rotor 24. The stator 22 includes a stator core 40 and an armature coil (or stator coil) 42. The stator core 40 is formed in a cylindrical shape. In the stator core 40, there are formed a plurality of teeth protruding radially inward and a plurality of slots recessed radially outward. The teeth are formed at predetermined intervals in a circumferential direction of the stator core 40. The slots are also formed at predetermined intervals in the circumferential direction of the stator core 40. Moreover, the teeth are located alternately with the slots in the circumferential direction.

The armature coil 42 is wound on the stator core 40 (more specifically, on the teeth). The armature coil 42 has slot-accommodated parts (not shown), which are accommodated in the slots of the stator core 40, and a pair of annular coil end parts 44 protruding axially outward respectively from two axial ends of the stator core 40. The armature coil 42 includes phase windings the number of which corresponds to the number of phases of the rotating electric machine 20 (e.g., three).

The rotor 24 is arranged radially inside the stator 22 (more specifically, the distal ends of the teeth) to face the stator 22 with a predetermined air gap G0 formed therebetween. The rotor 24 constitutes part of the magnetic circuit formed in the rotating electric machine 20. Moreover, the rotor 24 forms magnetic poles upon being supplied with electric current. In the present embodiment, the rotor 24 is configured as a so-called Lundell-type rotor. As shown in FIGS. 1-5, the rotor 24 includes a field core 50, a field coil 52, a short-circuiting member 54 and a plurality of permanent magnets 56.

The field core 50 consists of a pair of pole cores. The pole cores are formed by, for example, forging. Each of the pole cores has a boss portion 58, a disc portion 60 and a plurality of claw-shaped magnetic pole portions 62. The boss portion 58 is cylindrical-shaped and has a shaft hole 66 formed along its central axis. In the shaft hole 66, there is fitted and fixed a rotating shaft 64. The disc portion 60 is disc-shaped and extends radially outward from an axially outer end portion of the boss portion 58.

Each of the claw-shaped magnetic pole portions 62 is connected with a radially outer end of the disc portion 60 and protrudes in a claw shape from the radially outer end of the disc portion 60 axially inward. That is, each of the claw-shaped magnetic pole portions 62 is located radially outside the boss portion 58. Moreover, each of the claw-shaped magnetic pole portions 62 has a substantially circular arc-shaped radially outer surface. Specifically, the radially outer surface of each of the claw-shaped magnetic pole portions 62 includes a circular arc centered at the central axis of the rotating shaft 64 or at a position closer than the central axis of the rotating shaft 64 to the claw-shaped magnetic pole portion 62.

Hereinafter, for the sake of convenience, the claw-shaped magnetic pole portions 62 of one of the pair of pole cores will be referred to as first claw-shaped magnetic pole portions 62-1 and the claw-shaped magnetic pole portions 62 of the other of the pair of pole cores will be referred to as second claw-shaped magnetic pole portions 62-2. The first claw-shaped magnetic pole portions 62-1 are arranged at predetermined intervals in the circumferential direction. The second claw-shaped magnetic pole portions 62-2 are also arranged at predetermined intervals in the circumferential direction. The number of the first claw-shaped magnetic pole portions 62-1 and the number of the second claw-shaped magnetic pole portions 62-2 are set to the same number (e.g., eight). The polarity (e.g., N) of magnetic poles formed by the first claw-shaped magnetic pole portions 62-1 and the polarity (e.g., S) of magnetic poles formed by the second claw-shaped magnetic pole portions 62-2 are different from (or opposite to) each other. The pair of pole cores are assembled to each other so that the first claw-shaped magnetic pole portions 62-1 are arranged alternately with the second claw-shaped magnetic pole portions 62-2 in the circumferential direction. Moreover, between each circumferentially-adjacent pair of the first and second claw-shaped magnetic pole portions 62-1 and 62-2, there is formed a gap 68.

Each of the first claw-shaped magnetic pole portions 62-1 protrudes in the claw shape from a first axial end (i.e., the upper end in FIG. 4) of the field core 50 toward a second axial end (i.e., the lower end in FIG. 4) of the field core 50. Each of the second claw-shaped magnetic pole portions 62-2 protrudes in the claw shape from the second axial end of the field core 50 toward the first axial end of the field core 50. The first claw-shaped magnetic pole portions 62-1 and the second claw-shaped magnetic pole portions 62-2 are identically shaped except for the positions at which they are arranged and the axial sides to which they protrude. The first claw-shaped magnetic pole portions 62-1 and the second claw-shaped magnetic pole portions 62-2 are arranged so that proximal end portions (or distal end portions) of the first claw-shaped magnetic pole portions 62-1 are on the axially opposite side to those of the second claw-shaped magnetic pole portions 62-2. Moreover, the first claw-shaped magnetic pole portions 62-1 and the second claw-shaped magnetic pole portions 62-2 are magnetized into different polarities.

Each of the claw-shaped magnetic pole portions 62 is formed to have a predetermined width in the circumferential direction (i.e., circumferential width) and a predetermined thickness in the radial direction (i.e., radial thickness). Moreover, each of the claw-shaped magnetic pole portions 62 is formed so that both the circumferential width and radial thickness of the claw-shaped magnetic pole portion 62 gradually decrease from the proximal end portion of the claw-shaped magnetic pole portion 62 in the vicinity of the disc portion 60 to the distal end portion of the claw-shaped magnetic pole portion 62. In other words, each of the claw-shaped magnetic pole portions 62 is formed so as to become thinner in both the circumferential and radial directions from the proximal end portion thereof to the distal end portion thereof. In addition, it is preferable that each of the claw-shaped magnetic pole portions 62 is formed symmetrically with respect to a circumferential center thereof.

The gaps 68, each of which is formed between one circumferentially-adjacent pair of the first and second claw-shaped magnetic pole portions 62-1 and 62-2, extend obliquely with respect to the axial direction (i.e., are oblique at a predetermined angle to the rotation axis of the rotor 24). Moreover, each of the gaps 68 is formed so that its circumferential dimension (i.e., circumferential size) hardly changes with the axial position, in other words, its circumferential dimension is kept at a constant value or within a very narrow range including the constant value.

In addition, to prevent magnetic imbalance from occurring in the rotor 24, it is preferable that all the gaps 68 have the same shape. However, particularly in the case of the rotor 24 rotating in only one direction, to reduce the iron loss, each of the claw-shaped magnetic pole portions 62 may be formed asymmetrically with respect to the circumferential center thereof so that the circumferential dimension of the gaps 68 is not constant in the axial direction.

The field coil 52 is arranged in a radial gap between the boss portions 58 and the claw-shaped magnetic pole portions 62 of the pair of pole cores. Upon direct current flowing therethrough, the field coil 52 causes magnetic flux to be generated in the field core 50. The field coil 52 generates magnetomotive force upon being energized. The field coil 52 is wound around the boss portions 58 of the pair of pole cores. The magnetic flux generated by the field coil 52 is guided, via the boss portions 58 and the disc portions 60, to the claw-shaped magnetic pole portions 62. That is, the boss portions 58 and the disc portions 60 together form magnetic paths for guiding the magnetic flux generated by the field coil 52 to the claw-shaped magnetic pole portions 62. The field coil 52 magnetizes, with the generated magnetic flux, the first claw-shaped magnetic pole portions 62-1 into N poles and the second claw-shaped magnetic pole portions 62-2 into S poles.

The short-circuiting member 54 is cylindrical-shaped and arranged radially outside the claw-shaped magnetic pole portions 62 (i.e., the first claw-shaped magnetic pole portions 62-1 and the second claw-shaped magnetic pole portions 62-2) to cover the radially outer surfaces of the claw-shaped magnetic pole portions 62. The short-circuiting member 54 has an axial length almost equal to the axial length of the claw-shaped magnetic pole portions 62 (i.e., the axial distance from the proximal end to the distal end in each of the claw-shaped magnetic pole portions 62). Moreover, the short-circuiting member 54 has a predetermined radial thickness (e.g., about 0.6 mm-1.0 mm with which it is possible to ensure both mechanical strength and magnetic performance in the rotor 24). The short-circuiting member 54 faces and abuts the claw-shaped magnetic pole portions 62 on their radially outer side and closes the gaps 68, each of which is formed between one circumferentially-adjacent pair of the first and second claw-shaped magnetic pole portions 62-1 and 62-2, on their radially outer side, thereby magnetically connecting the first claw-shaped magnetic pole portions 62-1 and the second claw-shaped magnetic pole portions 62-2.

Figure 7:
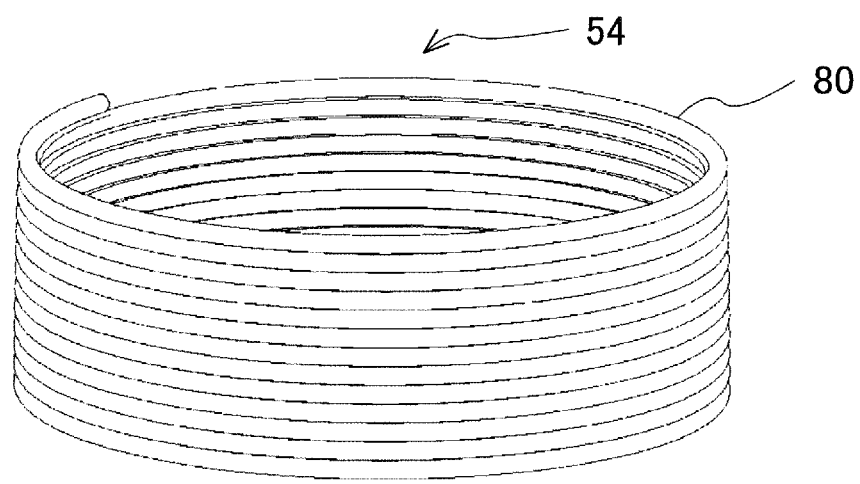
FIG. 7 is a perspective view of the short-circuiting member which is constituted of a wire-like member.
Figure 8:
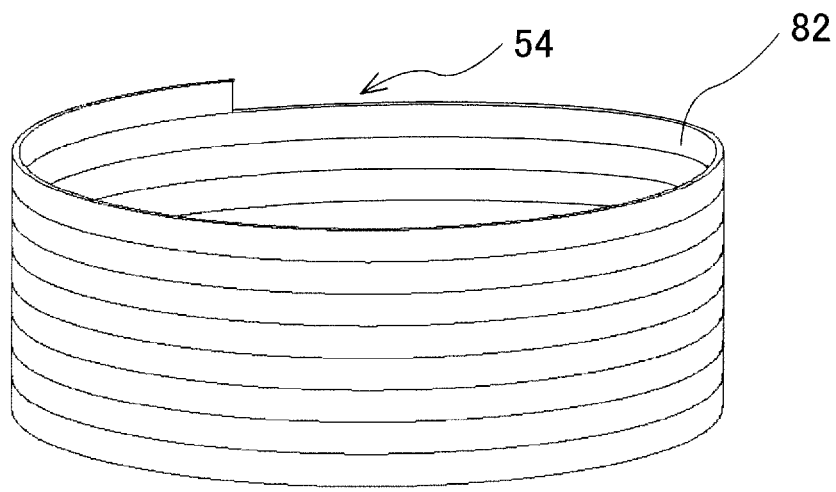
FIG. 8 is a perspective view of the short-circuiting member which is constituted of a band-like member.

The short-circuiting member 54 is formed of a soft-magnetic material, such as magnetic steel sheets made of iron or silicon steel. The short-circuiting member 54 may be constituted of a pipe-like member formed in a cylindrical shape or a laminate in which predetermined members are laminated in the axial direction. The short-circuiting member 54 is fixed to the claw-shaped magnetic pole portions 62 by shrink fitting, press fitting, welding or any combination of the aforementioned methods. In the case of the short-circuiting member 54 being constituted of a laminate, the laminate may be a member in which soft-magnetic sheets, such as magnetic steel sheets shaped by blanking, are laminated in the axial direction. In addition, to suppress eddy current loss, it is preferable to perform interlayer insulation for each axially-adjacent pair of the sheets. Alternatively, the laminate may be a single wire-like member 80 that spirally extends and is thereby laminated in the axial direction as shown in FIG. 7 or a single band-like member 82 that spirally extends and is thereby laminated in the axial direction as shown in FIG. 8. In terms of strength and magnetic performance, it is preferable for the wire-like member 80 and the band-like member 82 to be formed of a square bar having a rectangular cross section; however, the wire-like member 80 and the band-like member 82 may also be formed of a round wire or a wire with rounded corners.

The short-circuiting member 54 has a function of smoothing the radially outer periphery of the rotor 24 and thereby reducing wind noise caused by unevenness of the radially outer periphery of the rotor 24. Moreover, the short-circuiting member 54 also has a function of connecting the claw-shaped magnetic pole portions 62, which are arranged in the circumferential direction, to one another and thereby suppressing deformation (more particularly, radial deformation) of each of the claw-shaped magnetic pole portions 62.

The permanent magnets 56 are received on the radially inner side of the short-circuiting member 54. Each of the permanent magnets 56 is an inter-pole magnet which is arranged between one circumferentially-adjacent pair of the claw-shaped magnetic pole portions 62, i.e., arranged to fill the gap 68 formed between one circumferentially-adjacent pair of the first and second claw-shaped magnetic pole portions 62-1 and 62-2. In each of the gaps 68, there is arranged one of the permanent magnets 56; therefore, the number of the permanent magnets 56 is equal to the number of the gaps 68.

Each of the permanent magnets 56 extends, along the shape of the gap 68, obliquely with respect to the rotation axis of the rotor 24. Each of the permanent magnets 56 is formed in a substantially cuboid shape. The permanent magnets 56 have a function of reducing leakage of magnetic flux between the claw-shaped magnetic pole portions 62 and thereby intensifying magnetic flux transferred between the claw-shaped magnetic pole portions 62 and the stator core 40 of the stator 22.

The permanent magnets 56 are provided to form magnetic poles that are oriented to reduce leakage magnetic flux between each circumferentially-adjacent pair of the claw-shaped magnetic pole portions 62. That is, each of the permanent magnets 56 is magnetized so that the magnetomotive force acts in the circumferential direction. Specifically, each of the permanent magnets 56 is configured to have its N pole formed at a circumferential surface thereof facing the first claw-shaped magnetic pole portion 62-1 to be magnetized into an N pole and its S pole formed at a circumferential surface thereof facing the second claw-shaped magnetic pole portion 62-2 to be magnetized into an S pole. In addition, it is preferable for the permanent magnets 56 to be magnetized after being assembled into the rotor 24; however, the permanent magnets 56 may also be assembled into the rotor 24 after being magnetized.

As shown in FIG. 1, the housing 26 accommodates both the stator 22 and the rotor 24 therein. Moreover, the housing 26 rotatably supports the rotating shaft 64 and the rotor 24 and fixes the stator 22.

The brush device 28 includes a pair of slip rings 70 and a pair of brushes 72. The slip rings 70 are fixed on one axial end portion (i.e., a right end portion in FIG. 1) of the rotating shaft 64 and have a function of supplying direct current to the field coil 52 of the rotor 24. The brushes 72 are held by a brush holder that is mounted and fixed to the housing 26. Each of the brushes 72 is arranged in a state of being pressed to the rotating shaft 64 side so that a radially inner end portion of the brush 72 can slide on the surface of a corresponding one of the slip rings 70. The brushes 72 supply direct current to the field coil 52 via the slip rings 70.

The rectifier 30 is electrically connected with the armature coil 42 of the stator 22. The rectifier 30 rectifies alternating current generated in the armature coil 42 into direct current and outputs the resultant direct current. The voltage regulator 32 is a device which regulates an output voltage of the rotating electric machine 20 by controlling the field current (i.e., direct current) supplied to the field coil 52. The voltage regulator 32 has a function of keeping the output voltage substantially constant which otherwise varies according to electrical loads and the amount of electric power generated by the rotating electric machine 20. The pulley 34 is provided to transmit rotation of the engine of the vehicle to the rotor 24 of the rotating electric machine 20. The pulley 34 is fixed, by fastening, on another axial end portion (i.e., a left end portion in FIG. 1) of the rotating shaft 64.

In the rotating electric machine 20 having the above-described structure, when direct current is supplied from the electric power source to the field coil 52 of the rotor 24 via the brush device 28, the supply of the direct current causes magnetic flux to be generated which flows through the boss portions 58, disc portions 60 and claw-shaped magnetic pole portions 62 of the pair of pole cores, penetrating the field coil 52. The magnetic flux forms a magnetic circuit along which the magnetic flux flows in the order of, for example, the boss portion 58 of one of the pair of pole cores→the disc portion 60 of the one of the pair of pole cores→the first claw-shaped magnetic pole portions 62-1→the stator core 40→the second claw-shaped magnetic pole portions 62-2→the disc portion 60 of the other of the pair of pole cores→the boss portion 58 of the other of the pair of pole cores→the boss portion 58 of the one of the pair of pole cores. The magnetic circuit generates counterelectromotive force in the rotor 24.

Upon the above-described magnetic flux being guided to the first and second claw-shaped magnetic pole portions 62-1 and 62-2, each of the first claw-shaped magnetic pole portions 62-1 is magnetized into an N pole whereas each of the second claw-shaped magnetic pole portions 62-2 is magnetized into an S pole. With the claw-shaped magnetic pole portions 62 magnetized in the above manner, three-phase alternating current, which is converted from the direct current supplied from the electric power source, is supplied to the armature coil 42, causing the rotor 24 to rotate relative to the stator 22. Consequently, it becomes possible to cause the rotating electric machine 20 to function as an electric motor that rotates with the supply of electric power to the armature coil 42.

Moreover, the rotor 24 of the rotating electric machine 20 rotates upon transmission of torque from the engine of the vehicle to the rotating shaft 64 via the pulley 34. With the rotation of the rotor 24, a rotating magnetic field is applied to the armature coil 42 of the stator 22, causing AC electromotive force to be generated in the armature coil 42. The AC electromotive force generated in the armature coil 42 is rectified by the rectifier 30 into direct current, and the resultant direct current is supplied to the battery. Consequently, it becomes possible to cause the rotating electric machine 20 to function as an electric generator that generates the electromotive force in the armature coil 42, thereby charging the battery.

Next, the characteristic configuration of the rotating electric machine 20 according to the present embodiment will be described.

In the present embodiment, the rotating electric machine 20 includes the stator 22 and the rotor 24 that are radially opposed to each other with the predetermined air gap G0 formed therebetween. The stator 22 includes the cylindrical stator core 40 on which the armature coil 42 is wound. The armature coil 42 has the pair of coil end parts 44 protruding axially outward respectively from the two axial ends of the stator core 40. The rotor 24 includes the tubular short-circuiting member 54 that is arranged radially outside the claw-shaped magnetic pole portions 62 to cover the radially outer surfaces of the claw-shaped magnetic pole portions 62. The short-circuiting member 54 is fixed to the claw-shaped magnetic pole portions 62.

Each of the claw-shaped magnetic pole portions 62 is formed to have the two axial end portions (i.e., the proximal end portion and the distal end portion) thereof protruding axially outward respectively from the two axial ends of the stator core 40. Moreover, the short-circuiting member 54 is formed to have its two axial end portions 54*t* protruding axially outward respectively from the two axial ends of the stator core 40. The short-circuiting member 54 has an axial length Lt that is larger than the axial length Ls of the stator core 40. Furthermore, the short-circuiting member 54 is arranged to protrude from the stator core 40 on both the axial sides of the stator core 40. Consequently, the two axial end portions 54t of the short-circuiting member 54 respectively radially face the pair of coil end parts 44. Between each radially-facing pair of the axial end portions 54t of the short-circuiting member 54 and the coil end parts 44, there is formed an air gap that is larger than the predetermined air gap G0 provided between the rotor 24 (more specifically, the short-circuiting member 54) and the stator 22 (more specifically, the stator core 40).

Figure 6:
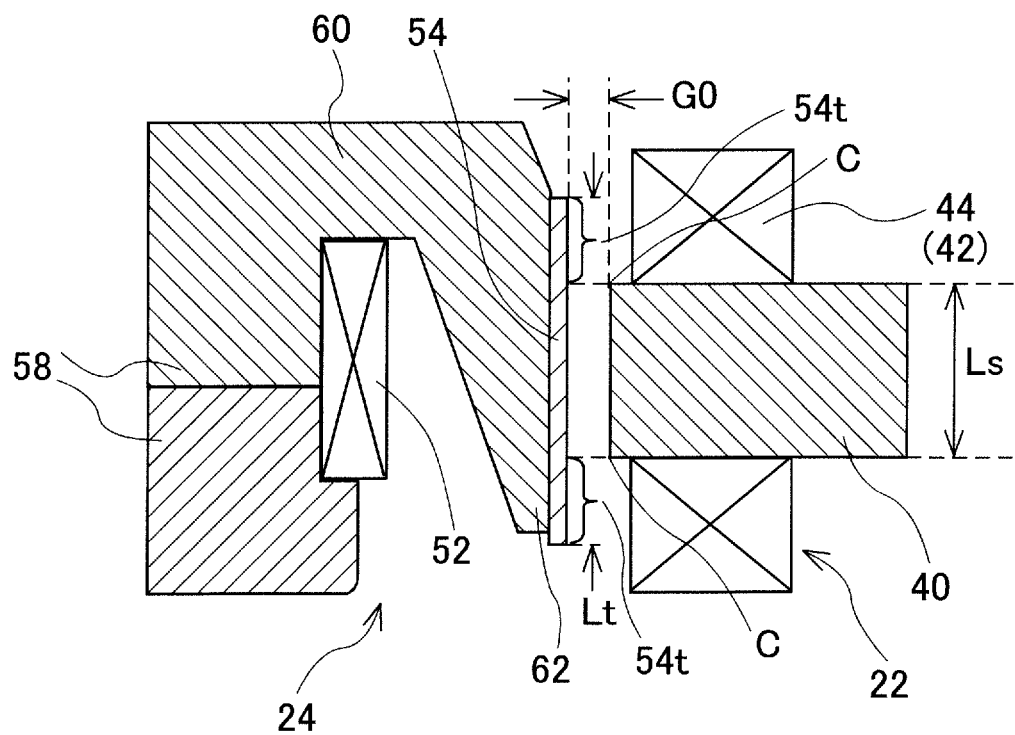
FIG. 6 is a partially cross-sectional view of a stator and the rotor of the rotating electric machine.
Figure 9:
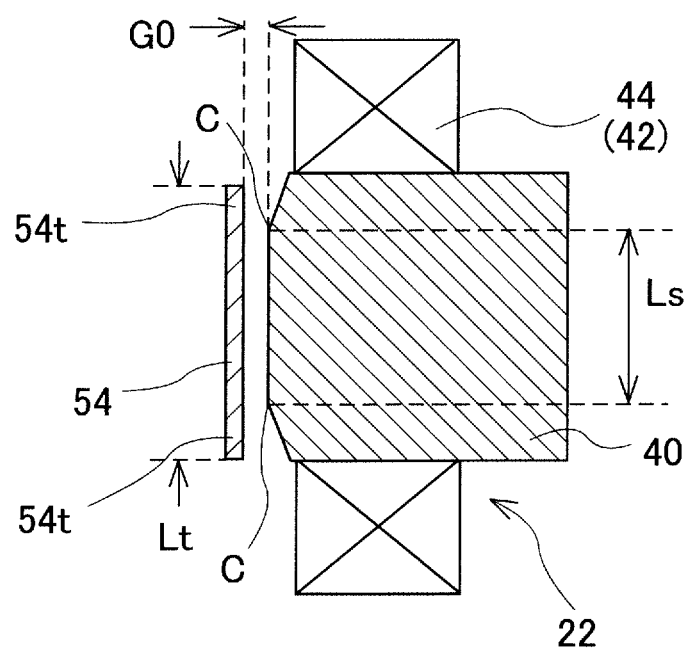
FIG. 9 is a schematic view illustrating axial ends of a stator core.
Figure 10:
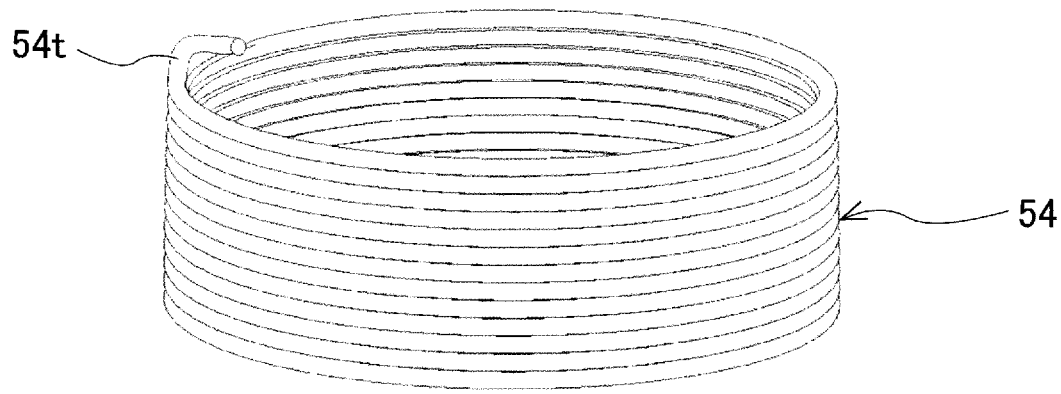
FIG. 10 is a perspective view of a short-circuiting member included in a rotating electric machine according to a modification.

In addition, as shown in FIG. 6, the "two axial ends" of the stator core 40 denote two axial ends C of a radially inner surface of the stator core 40 which faces the rotor 24 through the predetermined air gap G0. Moreover, as shown in FIG. 9, in the case of the stator core 40 having, on both axial sides (or only one axial side) of the radially inner surface thereof, a taper surface formed to have the air gap between the rotor 24 and the stator 22 expanded, the "two axial ends" of the stator core 40 still denote the two axial ends C of the radially inner surface facing the rotor 24 through the predetermined air gap G0 (i.e., the boundary positions between the radially inner surface and the taper surfaces). In addition, in this case, the axial length Ls of the stator core 40 denotes only the axial length of the radially inner surface facing the rotor 24 through the predetermined air gap G0, without including the axial lengths of the taper surfaces.

In the rotating electric machine 20 having the above-described structure, the two axial end portions 54t of the cylindrical short-circuiting member 54 protrude axially outward respectively from the two axial ends of the stator core 40. Consequently, when damage is caused to the two axial end portions 54t of the short-circuiting member 54, it is difficult for the damaged portions of the short-circuiting member 54 to be caught on the teeth or in the slots; the teeth and the slots are on the radially inner side in the stator core 40. Moreover, the air gaps between the two axial end portions 54t of the short-circuiting member 54 and the pair of coil end parts 44 are larger than the predetermined air gap G0 between an axial central portion of the short-circuiting member 54 and the stator core 40. Consequently, it is also difficult for the damaged portions of the short-circuiting member 54 to be caught on the coil end parts 44. Hence, in the rotating electric machine 20, when the axial end portions 54t of the short-circuiting member 54 are damaged due to aging changes, it is possible to reliably prevent the rotor 24 from being locked due to the damage.

In particular, the first claw-shaped magnetic pole portions 62-1 are arranged alternately with the second claw-shaped magnetic pole portions 62-2 in the circumferential direction so that the proximal end portions (or distal end portions) of the first claw-shaped magnetic pole portions 62-1 are on the axially opposite side to those of the second claw-shaped magnetic pole portions 62-2. The first claw-shaped magnetic pole portions 62-1 and the second claw-shaped magnetic pole portions 62-2 are magnetized into different polarities from each other. Moreover, the short-circuiting member 54 is arranged to protrude from the stator core 40 on both the axial sides of the stator core 40. Since stress caused by the centrifugal force during rotation of the rotor 24 concentrates on the distal end portion in each of the claw-shaped magnetic pole portions 62, the amount of flexure of each of the claw-shaped magnetic pole portions 62 is small at an axial central portion thereof and increases from the axial central portion to the distal end portion thereof. In addition, the distal end portions of the claw-shaped magnetic pole portions 62 protrude axially outward from the corresponding axial ends of the stator core 40.

Hence, in the rotating electric machine 20, since the distal end portions of the claw-shaped magnetic pole portions 62, where the amount of flexure is large during rotation of the rotor 24, are arranged axially outside the stator core 40, it becomes possible to have deformation of the claw-shaped magnetic pole portions 62 due to aging changes occur at positions not facing the stator core 40 and thus axially outside the stator core 40. Consequently, when the axial end portions 54t of the short-circuiting member 54 are damaged due to deformation of the claw-shaped magnetic pole portions 62, it is possible to reliably prevent the rotor 24 from being locked due to the damage.

In the present embodiment, to detect damage to the axial end portions 54t of the short-circuiting member 54 of the rotor 24, the axial end portions 54t of the short-circuiting member 54 are arranged to radially face the corresponding coil end parts 44 and a current sensor (not shown) is provided to detect electric current flowing in the armature coil 42 of the stator 22. When the axial end portions 54t of the short-circuiting member 54 are damaged and the damaged portions are further scattered, it is easy for the damaged portions to be displaced radially outward by the centrifugal force during rotation and make contact with the coil end parts 44 of the armature coil 42. Upon the damaged portions of the short-circuiting member 54 making contact with the coil end parts 44, the armature coil 42 is electrically short-circuited with the short-circuiting member 54, causing abnormal electric current, which does not flow during normal operation, to flow in the armature coil 42. The current sensor detects the electric current flowing in the armature coil 42. A controller (not shown), which is electrically connected with the current sensor, detects the abnormal current flowing in the armature coil 42 on the basis of the electric current detected by the current sensor, thereby detecting the shirt-circuit of the armature coil 42. Consequently, the controller also detects the damage to the short-circuiting member 54.

In the rotating electric machine 20, the amount of flexure of each of the claw-shaped magnetic pole portions 62 during rotation is largest at the distal end portion thereof. Consequently, it becomes possible to have damage to the two axial end portions 54t of the short-circuiting member 54 occur earlier than damage to the other portions of the short-circuiting member 54. With such a configuration, when the axial end portions 54t of the short-circuiting member 54 are damaged due to aging changes, it is possible to have the damaged portions make contact with the coil end parts 44 of the armature coil 42 before the entire short-circuiting member 54 is damaged. Therefore, with the structure of the rotating electric machine 20, it is possible to detect occurrence of damage to the short-circuiting member 54 due to aging changes in advance or in an early stage using the current sensor.

Hence, according to the present embodiment, it is possible to detect damage to the short-circuiting member 54 due to aging changes in advance or in an early stage using the current sensor and controller. It is also possible to perform, upon detection of the damage, repair or replacement of parts, thereby reliably preventing the rotor 24 from being locked by engagement between the rotor 24 and the stator 22 due to the damage to the short-circuiting member 54.

As described above, the rotating electric machine 20 according to the present embodiment includes the stator 22 and the rotor 24. The stator 22 includes the stator core 40 and the armature coil 42 wound on the stator core 40. The rotor 24 is arranged radially inside the stator 22 to radially face the stator 22. The rotor 24 includes: the field core 50 having the claw-shaped magnetic pole portions 62 for respectively forming the magnetic poles the polarities of which are alternately different in the circumferential direction; the field coil 52 wound on the field core 50; and the cylindrical short-circuiting member 54 that is arranged radially outside the claw-shaped magnetic pole portions 62 to cover the radially outer surfaces of the claw-shaped magnetic pole portions 62 and magnetically connects each circumferentially-adjacent pair of the claw-shaped magnetic pole portions 62. The two axial end portions 54t of the short-circuiting member 54 protrude axially outward respectively from the two axial ends of the stator core 40.

With the above configuration, since the two axial end portions 54t of the cylindrical short-circuiting member 54, which covers the radially outer surfaces of the claw-shaped magnetic pole portions 62, protrude axially outward respectively from the two axial ends of the stator core 40, when damage is caused to the protruding axial end portions 54t of the short-circuiting member 54, it is difficult for the damaged portions of the short-circuiting member 54 to be caught on a radially inner part of the stator core 40. Hence, when the axial end portions 54t of the short-circuiting member 54 are damaged due to aging changes, it is possible to reliably prevent the rotor 24 from being locked due to the damage.

Moreover, in the rotating electric machine 20, the two axial end portions 54t of the short-circuiting member 54 are arranged to respectively radially face the pair of coil end parts 44 of the armature coil 42 which protrude axially outward respectively from the two axial ends of the stator core 40.

With the above configuration, since the two axial end portions 54t of the short-circuiting member 54 respectively radially face the pair of coil end parts 44, when the axial end portions 54t of the short-circuiting member 54 are damaged, it is possible to have the damaged portions make contact with the coil end parts 44 by the centrifugal force during rotation. Therefore, it is possible to detect damage to the short-circuiting member 54 based on whether the electric current flowing in the coil end parts 44 is normal or abnormal.

The present invention is not limited to the above-described embodiment. On the two axial end portions 54t of the short-circuiting member 54, a process may be performed which makes it easier for damage to be caused to the two axial end portions 54t than to the other portions of the short-circuiting member 54.

For example, a welding process may be performed on the two axial end portions 54t of the short-circuiting member 54, thereby making the two axial end portions 54t more brittle than the other portions of the short-circuiting member 54 and thus the strength of the two axial end portions 54t lower than the strength of the other portions. In addition, the welding process may be performed, in fixing the short-circuiting member 54 to the claw-shaped magnetic pole portions 62, for each of the claw-shaped magnetic pole portions 62. With the configuration of such a modification, it is possible to make the two axial end portions 54t of the short-circuiting member 54 more brittle than the axial central portion of the short-circuiting member 54, thereby having damage to the axial end portions 54t occur earlier than damage to the axial central portion of the short-circuiting member 54. Consequently, it is possible to detect damage to the short-circuiting member 54 due to aging changes in advance or in an early stage.

As an alternative, a crimping process may be performed on the two axial end portions 54t of the short-circuiting member 54, thereby making the two axial end portions 54t more brittle than the other portions of the short-circuiting member 54 and thus the strength of the two axial end portions 54t lower than the strength of the other portions. In addition, the crimping process may be performed, in fixing the short-circuiting member 54 to the claw-shaped magnetic pole portions 62, for each of the claw-shaped magnetic pole portions 62. With the configuration of such a modification, in the two axial end portions 54t of the short-circuiting member 54, the material is plastically deformed by the crimping process to cause shape change and work hardening. Therefore, it is possible to have a large stress concentration occur particularly at boundaries between the non-hardened and hardened portions. Consequently, it is possible to have damage to the axial end portions 54t of the short-circuiting member 54 occur earlier than damage to the axial central portion of the short-circuiting member 54; thus it is possible to detect damage to the short-circuiting member 54 due to aging changes in advance or in an early stage.

As another alternative, a press process may be performed on the two axial end portions 54t of the short-circuiting member 54, thereby making the two axial end portions 54t more brittle than the other portions of the short-circuiting member 54 and thus the strength of the two axial end portions 54t lower than the strength of the other portions. With the configuration of such a modification, in the two axial end portions 54t of the short-circuiting member 54, the material is plastically deformed by the press process to cause shape change and work hardening. Therefore, it is possible to have a large stress concentration occur particularly at boundaries between the non-hardened and hardened portions. Consequently, it is possible to have damage to the axial end portions 54t of the short-circuiting member 54 occur earlier than damage to the axial central portion of the short-circuiting member 54; thus it is possible to detect damage to the short-circuiting member 54 due to aging changes in advance or in an early stage.

Moreover, the short-circuiting member 54 may be configured such that the material of the two axial end portions 54t is different from the material of the other portions (more particularly, the axial central portion), thereby making the two axial end portions 54t more brittle than the other portions and thus the strength of the two axial end portions 54t lower than the strength of the other portions. For example, as the material of the two axial end portions 54t, a low-carbon material with low strength may be employed. Moreover, it is preferable for the material of the two axial end portions 54t to be low in at least one of tensile strength and yield point than the material of the axial central portion. With the configuration of such a modification, it is possible to cause a stress difference between the two axial end portions 54t and the axial central portion of the short-circuiting member 54, thereby having breakage occur preferentially at the boundaries between the different materials. Consequently, it is possible to have damage to the axial end portions 54t of the short-circuiting member 54 occur earlier than damage to the axial central portion of the short-circuiting member 54; thus it is possible to detect damage to the short-circuiting member 54 due to aging changes in advance or in an early stage.

In addition, in the above modification of the short-circuiting member 54 where the material of the two axial end portions 54t is different from the material of the other portions, in the case of the short-circuiting member 54 being constituted of a laminate in which a plurality of predetermined members are laminated in the axial direction, the predetermined members may be laminated in three or more layers and a material of the predetermined members of the layers constituting the two axial end portions 54t may be different a material of the predetermined members of the layers constituting the axial central portion. Moreover, in this case, the material of the predetermined members of all of the layers constituting the two axial end portions 54t may be different from the material of the predetermined members of the layers constituting the axial central portion; alternatively, the material of the predetermined members of only some of the layers constituting the two axial end portions 54t may be different from the material of the predetermined members of the layers constituting the axial central portion.

Moreover, as shown in FIGS. 10-13, the short-circuiting member 54 may be formed such that the two axial end portions 54t bulge radially outward from the other portions (more particularly, the axial central portion), thereby making the two axial end portions 54t more brittle than the other portions and thus the strength of the two axial end portions 54t lower than the strength of the other portions. With the configuration of such a modification, the centrifugal force acting on the two axial end portions 54t that bulge is smaller than the centrifugal force acting on the axial central portion that does not bulge. Therefore, it is possible to have stress concentration occur in the two axial end portions 54t. Consequently, it is possible to have damage to the axial end portions 54t of the short-circuiting member 54 occur earlier than damage to the axial central portion of the short-circuiting member 54; thus it is possible to detect damage to the short-circuiting member 54 due to aging changes in advance or in an early stage.

Figure 11:
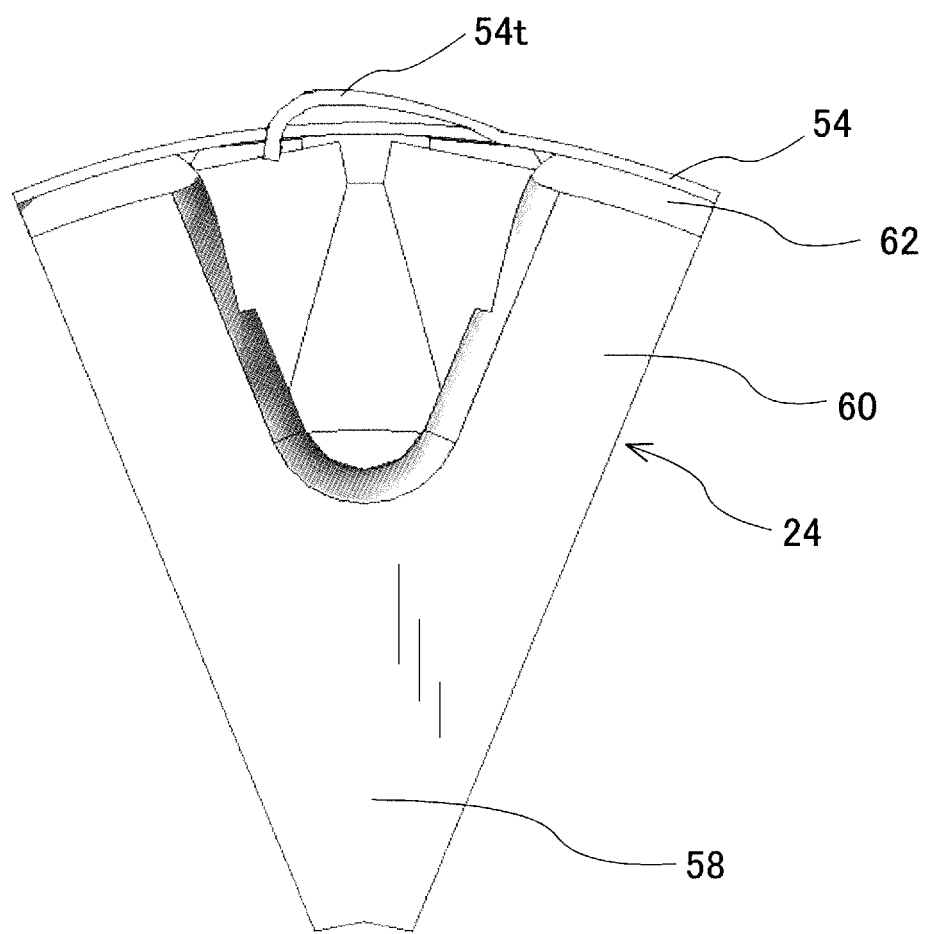
FIG. 11 is an axial end view of part of a rotor which includes the short-circuiting member shown in FIG. 10.
Figure 12:
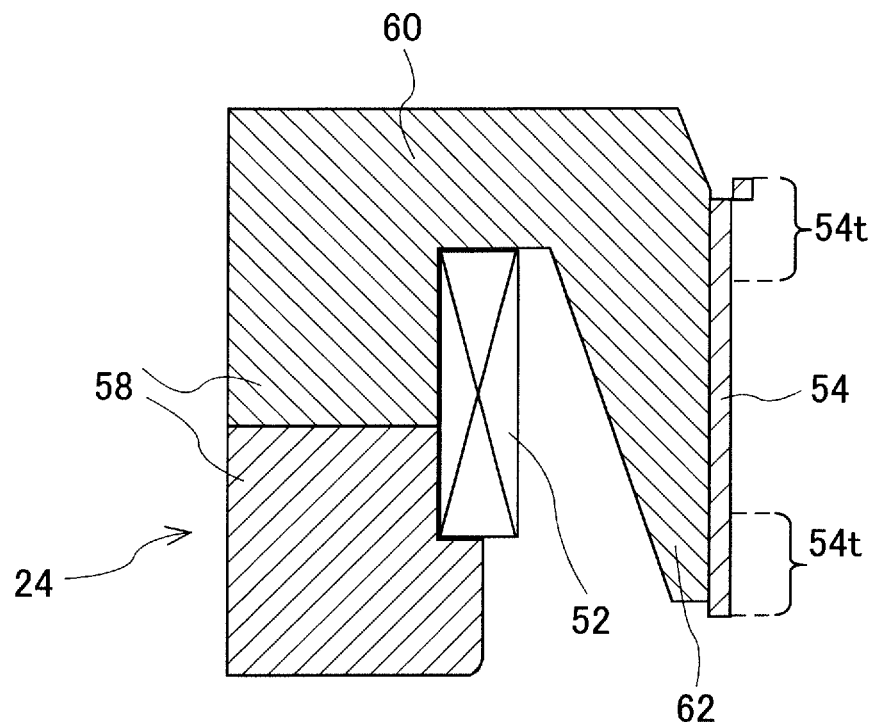
FIG. 12 is a partially cross-sectional view of the rotor which includes the short-circuiting member shown in FIG. 10.
Figure 13:
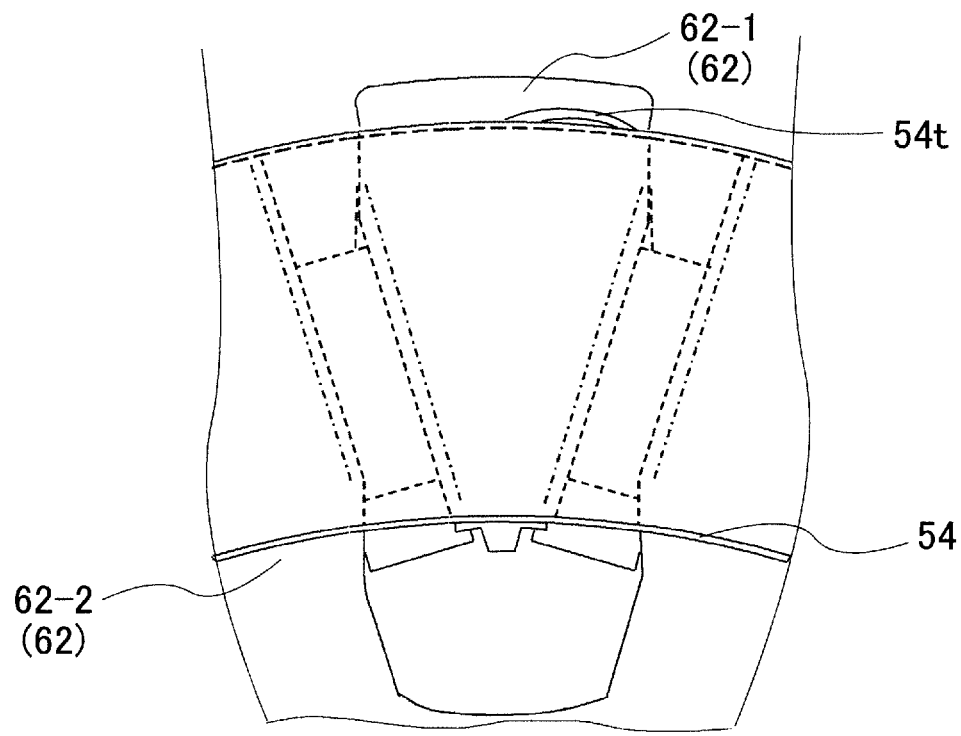
FIG. 13 is a perceptive view of part of the rotor which includes the short-circuiting member shown in FIG. 10.

In addition, in the above modification of the short-circuiting member 54 where the two axial end portions 54t bulge radially outward from the other portions, it is preferable for the short-circuiting member 54 to be constituted of a laminate in which a single wire-like member or a single band-like member spirally extends and is thereby laminated in the axial direction. This is because in terms of providing bulges in the two axial end portions 54t of the short-circuiting member 54 and fixing the short-circuiting member 54 to the claw-shaped magnetic pole portions 62, it is preferable for the layers of the short-circuiting member 54 to be connected with one another. Moreover, in this case, as shown in FIG. 11, the short-circuiting member 54 may be formed so that each of the axial end portions 54t extends radially outward and has a curvature on its distal end side different from (more specifically, higher than) the curvature of the axial central portion. Moreover, in this case, it is possible to form all of the layers constituting the two axial end portions 54t to bulge radially outward from the layers constituting the axial central portion; alternatively, it is possible to form only some (more particularly, the axially outermost ones) of the layers constituting the two axial end portions 54t to bulge radially outward from the layers constituting the axial central portion.

Moreover, as described previously, the short-circuiting member 54 is fixed to the claw-shaped magnetic pole portions 62 by shrink fitting, press fitting, welding or any combination of the aforementioned methods. It is preferable for the short-circuiting member 54 to be joined to the distal end portions of the claw-shaped magnetic pole portions 62 (more specifically, those portions of the claw-shaped magnetic pole portions 62 which face the corresponding axial end portions 54t of the short-circuiting member 54) by welding or crimping. With the configuration of such a modification, the short-circuiting member 54 is joined to the distal end portions, where stress due to the centrifugal force is highest, of the claw-shaped magnetic pole portions 62. Therefore, it is possible to have damage to the short-circuiting member 54 occur preferentially at the joints formed in the two axial end portions 54t. Consequently, it is possible to detect damage to the short-circuiting member 54 due to aging changes in advance or in an early stage. In addition, the short-circuiting member 54 may be joined to all of the distal end portions of the claw-shaped magnetic pole portions 62. However, to prevent the strength of the short-circuiting member 54 from being excessively lowered, the short-circuiting member 54 may be joined to only some of the distal end portions of the claw-shaped magnetic pole portions 62. It is preferable for the short-circuiting member 54 to be joined to only one of the distal end portions of the claw-shaped magnetic pole portions 62.

In the above-described embodiment, the two axial end portions 54t of the short-circuiting member 54 protrude axially outward respectively from the two axial ends of the stator core 40. In the case of the short-circuiting member 54 being constituted of a laminate in which a plurality of predetermined members are laminated in the axial direction, each of the axial end portions 54t may protrude axially outward from the corresponding axial end of the stator core 40 by only one layer. With the configuration of such a modification, unlike in the case of the short-circuiting member 54 being constituted of a cylindrical pipe-like member, it is possible to limit those portions of the short-circuiting member 54 to which damage may be caused to the axially outermost layers, thereby preventing damage from being caused to those layers which are located axially inside the axially outermost layers. Consequently, it is possible to prevent the damaged portions of the short-circuiting member 54 from being caught on a radially inner part of the stator core 40 while suppressing the amount by which the short-circuiting member 54 protrudes axially outward from the axial ends of the stator core 40. In addition, the above modification may be applied to the case of the short-circuiting member 54 being constituted of a laminate in which a single wire-like member 80 or a single band-like member 82 spirally extends and is thereby laminated in the axial direction; alternatively, the above modification may be applied to the case of the short-circuiting member 54 being constituted of a laminate in which sheets, such as magnetic steel sheets, are laminated in the axial direction.

Figure 14A:
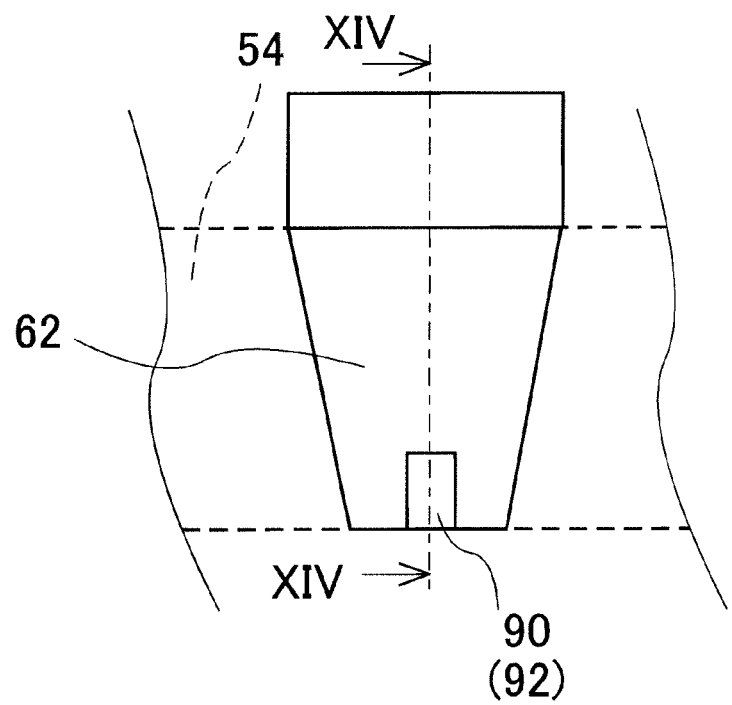
FIG. 14A is a schematic plan view, from the radially outer side through a short-circuiting member, of a claw-shaped magnetic pole portion of a rotor included in a rotating electric machine according to another modification.
Figure 14B:
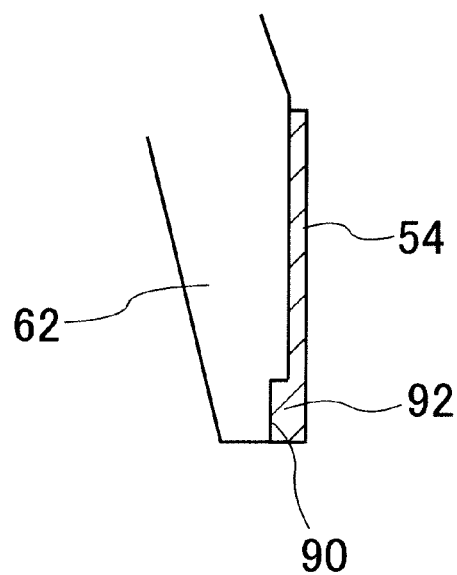
FIG. 14B is a cross-sectional view taken along the line XIV-XIV in FIG. 14A.
Figure 15A:
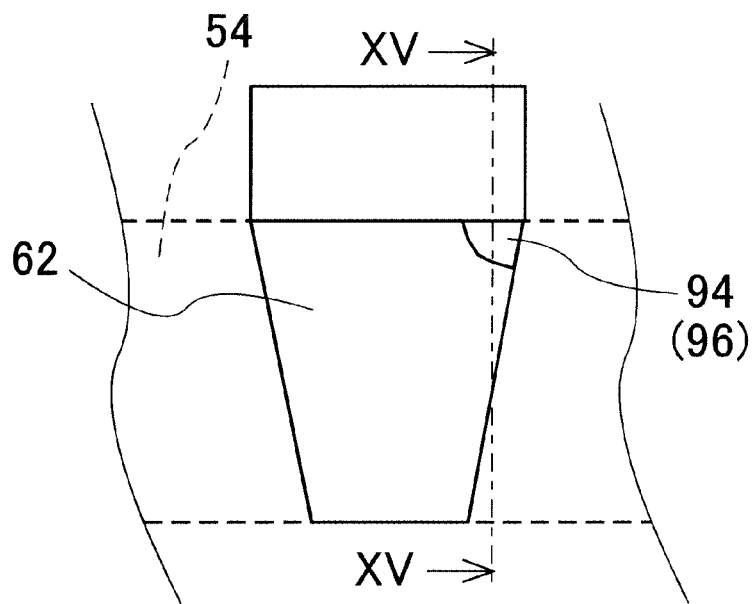
FIG. 15A is a schematic plan view, from the radially outer side through a short-circuiting member, of a claw-shaped magnetic pole portion of a rotor included in a rotating electric machine according to yet another modification.
Figure 15B:
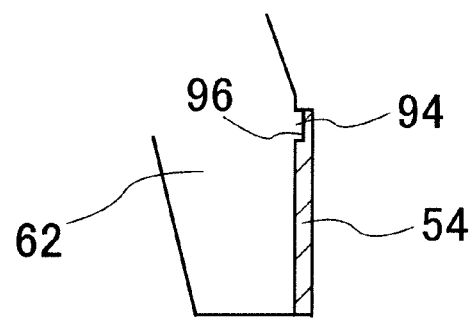
FIG. 15B is a cross-sectional view taken along the line XV-XV in FIG. 15A.

In the above-described embodiment, the short-circuiting member 54 is fixed to the claw-shaped magnetic pole portions 62. This fixing may be realized by fitting protrusions into recesses. The protrusions and the recesses are formed in the claw-shaped magnetic pole portions 62 and the short-circuiting member 54 to protrude or be recessed from opposing surfaces of the claw-shaped magnetic pole portions 62 and the short-circuiting member 54. For example, as shown in FIGS. 14A-B, the short-circuiting member 54 may be fixed to the claw-shaped magnetic pole portions 62 by forming recesses 90 in the radially outer surfaces (i.e., opposing surfaces) of the claw-shaped magnetic pole portions 62 and protrusions 92 on the radially inner surface (i.e., opposing surface) of the short-circuiting member 54 and fitting the protrusions 92 respectively into the recesses 90. Alternatively, as shown in FIGS. 15A-B, the short-circuiting member 54 may be fixed to the claw-shaped magnetic pole portions 62 by forming protrusions 94 on the radially outer surfaces of the claw-shaped magnetic pole portions 62 and recesses 96 in the radially inner surface of the short-circuiting member 54 and fitting the protrusions 94 respectively into the recesses 96.

With the configuration of such a modification, it is possible to fix the short-circuiting member 54 to the claw-shaped magnetic pole portions 62 using the protrusions and the recesses on the magnetic circuit formed in the rotor 24; it is also possible to increase the q-axis inductance or lower the d-axis inductance in the claw-shaped magnetic pole portions 62 and thereby generate reluctance torque. As a result, it is possible to achieve torque improvement.

In the above-described embodiment, the detection of damage to the short-circuiting member 54 is performed based on the electric current which flows in the coil end parts 44 and is detected by the current sensor. However, the present invention is not limited to the above. It is also possible to detect a voltage generated in the coil end parts 44 and detect damage to the short-circuiting member 54 based on the voltage.

In addition, the present invention is not limited to the above-described embodiment and modifications, and various further modifications may be made without departing from the spirit of the present invention.

DESCRIPTION OF REFERENCE SIGNS

20: rotating electric machine, 22: stator, 24: rotor, 40: stator core, 42: armature coil, 44: coil end parts, 50: field core, 52: field coil, 54: short-circuiting member, 54t: axial end portions, 58: boss portions, 62: claw-shaped magnetic pole portions, 80: wire-like member, 82: band-like member, 90, 96: recesses, 92, 94: protrusions.

The invention claimed is:

1. A rotating electric machine comprising:
a stator including a stator core and an armature coil wound on the stator core; and
a rotor arranged radially inside the stator to radially face the stator, the rotor including a field core, a field coil and a tubular short-circuiting member, the field core having a plurality of magnetic pole portions for respectively forming a plurality of magnetic poles the polarities of which are alternately different in a circumferential direction, the field coil being wound on the field core, the short-circuiting member being arranged radially outside the magnetic pole portions to cover radially outer surfaces of the magnetic pole portions and magnetically connecting each circumferentially-adjacent pair of the magnetic pole portions,
wherein two axial end portions of the short-circuiting member protrude axially outward respectively from two axial ends of the stator core, and
wherein the two axial end portions of the short-circuiting member are formed of a different material from other portions of the short-circuiting member.

2. The rotating electric machine as set forth in claim 1, wherein the short-circuiting member is constituted of a laminate in which a plurality of predetermined members are laminated in three or more layers in an axial direction, and
a material of the predetermined members of the layers constituting the two axial end portions of the short-circuiting member is different from a material of the predetermined members of the layers constituting the other portions of the short-circuiting member.

3. The rotating electric machine as set forth in claim 1, wherein the magnetic pole portions of the field core comprise a plurality of first magnetic pole portions that protrude in a claw shape toward one side in an axial direction and a plurality of second magnetic pole portions that protrude in the claw shape toward the other side in the axial direction,
the first magnetic pole portions are arranged alternately with the second magnetic pole portions in the circumferential direction,
one of the two axial end portions of the short-circuiting member is joined to at least one of distal end portions of the first magnetic pole portions, and the other of the two axial end portions of the short-circuiting member is joined to at least one of distal end portions of the second magnetic pole portions.

4. The rotating electric machine as set forth in claim 1, wherein the two axial end portions of the short-circuiting member are arranged to respectively radially face a pair of coil end parts of the armature coil, the pair of coil end parts protruding axially outward respectively from the two axial ends of the stator core.

5. The rotating electric machine as set forth in claim 1, wherein on the two axial end portions of the short-circuiting member, a welding process, a crimping process or a press process has been performed.

6. A rotating electric machine comprising:
a stator including a stator core and an armature coil wound on the stator core; and
a rotor arranged radially inside the stator to radially face the stator, the rotor including a field core, a field coil and a tubular short-circuiting member, the field core having a plurality of magnetic pole portions for respectively forming a plurality of magnetic poles the polarities of which are alternately different in a circumferential direction, the field coil being wound on the field core, the short-circuiting member being arranged radially outside the magnetic pole portions to cover radially outer surfaces of the magnetic pole portions and magnetically connecting each circumferentially-adjacent pair of the magnetic pole portions,
wherein two axial end portions of the short-circuiting member protrude axially outward respectively from two axial ends of the stator core, and
wherein the two axial end portions of the short-circuiting member are formed to bulge radially outward from other portions of the short-circuiting member.

7. The rotating electric machine as set forth in claim 6, wherein the short-circuiting member is constituted of a wire-like or band-like member that spirally extends and is thereby laminated in an axial direction, and
a curvature of the two axial end portions of the short-circuiting member is different from a curvature of the other portions of the short-circuiting member.

8. The rotating electric machine as set forth in claim 6, wherein on the two axial end portions of the short-circuiting member, a welding process, a crimping process or a press process has been performed.

9. The rotating electric machine as set forth in claim 6, wherein the magnetic pole portions of the field core comprise a plurality of first magnetic pole portions that protrude in a claw shape toward one side in an axial direction and a plurality of second magnetic pole portions that protrude in the claw shape toward the other side in the axial direction,
the first magnetic pole portions are arranged alternately with the second magnetic pole portions in the circumferential direction,
one of the two axial end portions of the short-circuiting member is joined to at least one of distal end portions of the first magnetic pole portions, and the other of the two axial end portions of the short-circuiting member is joined to at least one of distal end portions of the second magnetic pole portions.

10. The rotating electric machine as set forth in claim 6, wherein the two axial end portions of the short-circuiting member are arranged to respectively radially face a pair of coil end parts of the armature coil, the pair of coil end parts protruding axially outward respectively from the two axial ends of the stator core.

11. A rotating electric machine comprising:
a stator including a stator core and an armature coil wound on the stator core; and
a rotor arranged radially inside the stator to radially face the stator, the rotor including a field core, a field coil and a tubular short-circuiting member, the field core having a plurality of magnetic pole portions for respectively forming a plurality of magnetic poles the polarities of which are alternately different in a circumferential direction, the field coil being wound on the field core, the short-circuiting member being arranged radially outside the magnetic pole portions to cover radially outer surfaces of the magnetic pole portions and magnetically connecting each circumferentially-adjacent pair of the magnetic pole portions,
wherein two axial end portions of the short-circuiting member protrude axially outward respectively from two axial ends of the stator core, and
wherein the short-circuiting member is constituted of a laminate in which a plurality of predetermined members are laminated in an axial direction, and
wherein each of the axial end portions of the short-circuiting member protrudes axially outward from a corresponding one of the axial ends of the stator core by only one layer.

12. A rotating electric machine comprising:
a stator including a stator core and an armature coil wound on the stator core; and
a rotor arranged radially inside the stator to radially face the stator, the rotor including a field core, a field coil and a tubular short-circuiting member, the field core having a plurality of magnetic pole portions for respectively forming a plurality of magnetic poles the polarities of which are alternately different in a circumferential direction, the field coil being wound on the field core, the short-circuiting member being arranged radially outside the magnetic pole portions to cover radially outer surfaces of the magnetic pole portions and magnetically connecting each circumferentially-adjacent pair of the magnetic pole portions,
wherein two axial end portions of the short-circuiting member protrude axially outward respectively from two axial ends of the stator core, and
wherein the short-circuiting member is fixed to the magnetic pole portions with a plurality of protrusions respectively fitted in a plurality of recesses, the protrusions and the recesses being formed in the magnetic pole portions and the short-circuiting member to protrude or be recessed from opposing surfaces of the magnetic pole portions and the short-circuiting member.

13. The rotating electric machine as set forth in claim 11, wherein the magnetic pole portions of the field core comprise a plurality of first magnetic pole portions that protrude in a claw shape toward one side in an axial direction and a plurality of second magnetic pole portions that protrude in the claw shape toward the other side in the axial direction,
the first magnetic pole portions are arranged alternately with the second magnetic pole portions in the circumferential direction,
one of the two axial end portions of the short-circuiting member is joined to at least one of distal end portions of the first magnetic pole portions, and the other of the two axial end portions of the short-circuiting member is joined to at least one of distal end portions of the second magnetic pole portions.

14. The rotating electric machine as set forth in claim 11, wherein the two axial end portions of the short-circuiting member are arranged to respectively radially face a pair of coil end parts of the armature coil, the pair of coil end parts protruding axially outward respectively from the two axial ends of the stator core.

15. The rotating electric machine as set forth in claim 11, wherein on the two axial end portions of the short-circuiting member, a welding process, a crimping process or a press process has been performed.

16. The rotating electric machine as set forth in claim 12, wherein on the two axial end portions of the short-circuiting member, a welding process, a crimping process or a press process has been performed.

17. The rotating electric machine as set forth in claim 12, wherein the magnetic pole portions of the field core comprise a plurality of first magnetic pole portions that protrude in a claw shape toward one side in an axial direction and a plurality of second magnetic pole portions that protrude in the claw shape toward the other side in the axial direction,
the first magnetic pole portions are arranged alternately with the second magnetic pole portions in the circumferential direction,
one of the two axial end portions of the short-circuiting member is joined to at least one of distal end portions of the first magnetic pole portions, and the other of the two axial end portions of the short-circuiting member is joined to at least one of distal end portions of the second magnetic pole portions.

18. The rotating electric machine as set forth in claim 12, wherein the two axial end portions of the short-circuiting member are arranged to respectively radially face a pair of coil end parts of the armature coil, the pair of coil end parts protruding axially outward respectively from the two axial ends of the stator core.

* * * * *